(12) United States Patent
Fareed et al.

(10) Patent No.: US 11,440,297 B2
(45) Date of Patent: Sep. 13, 2022

(54) BURN-OFF PROTECTIVE COATING

(71) Applicant: Vitro Flat Glass LLC, Cheswick, PA (US)

(72) Inventors: Farzad Fareed, Gibsonia, PA (US); Adam D. Polcyn, Pittsburgh, PA (US); Erin A. Casci, Pittsburgh, PA (US)

(73) Assignee: Vitro Flat Glass LLC, Cheswick, PA (US)

( * ) Notice: Subject to any disclaimer, the term of this patent is extended or adjusted under 35 U.S.C. 154(b) by 6 days.

(21) Appl. No.: 16/456,230

(22) Filed: Jun. 28, 2019

(65) Prior Publication Data

US 2020/0002223 A1 Jan. 2, 2020

Related U.S. Application Data

(60) Provisional application No. 62/691,814, filed on Jun. 29, 2018.

(51) Int. Cl.
| | | |
|---|---|---|
| *B32B 27/06* | (2006.01) | |
| *B32B 43/00* | (2006.01) | |
| *C03C 17/32* | (2006.01) | |
| *B32B 15/082* | (2006.01) | |
| *B32B 7/06* | (2019.01) | |
| *B32B 15/09* | (2006.01) | |
| *B32B 7/12* | (2006.01) | |
| *B32B 15/085* | (2006.01) | |

(Continued)

(52) U.S. Cl.
CPC ............ *B32B 27/06* (2013.01); *B32B 43/006* (2013.01); *C03C 17/32* (2013.01); *B32B 2255/26* (2013.01); *C03C 2217/78* (2013.01); *C03C 2218/11* (2013.01); *C03C 2218/328* (2013.01); *Y10T 428/19* (2015.01)

(58) Field of Classification Search
None
See application file for complete search history.

(56) References Cited

U.S. PATENT DOCUMENTS

| | | |
|---|---|---|
| 2,807,111 A | 9/1957 | Turner |
| 3,762,988 A | 10/1973 | Clock et al. |

(Continued)

FOREIGN PATENT DOCUMENTS

| | | |
|---|---|---|
| CN | 102046553 A | 5/2011 |
| CN | 102883823 A | 1/2013 |

(Continued)

OTHER PUBLICATIONS

Beech et al., Polymer Letters, vol. 8, pp. 731-734. (Year: 1970).*

(Continued)

*Primary Examiner* — Ramsey Zacharia
(74) *Attorney, Agent, or Firm* — The Webb Law Firm

(57) ABSTRACT

A protected substrate includes a planar substrate having a surface and a burn-off temporary protective layer positioned over at least a portion of the surface. The burn-off temporary protective layer includes a wax, a polyolefin, a polyester, a polycarbonate, a polyether, or some combination thereof. The burn-off temporary protective layer is removable by a heat treatment process that does not substantially damage the surface. Various other protected substrates and methods for protecting a substrate are also disclosed.

20 Claims, 6 Drawing Sheets

(51) Int. Cl.
*B32B 15/088* (2006.01)
*B32B 21/08* (2006.01)
*B32B 27/30* (2006.01)
*B32B 27/32* (2006.01)
*B32B 27/34* (2006.01)
*B32B 27/36* (2006.01)
*C03C 17/00* (2006.01)
*C09D 5/20* (2006.01)

(56) References Cited

U.S. PATENT DOCUMENTS

| | | | |
|---|---|---|---|
| 4,287,107 A | 9/1981 | Hermann et al. | |
| 4,466,562 A | 8/1984 | DeTorre | |
| 4,504,109 A | 3/1985 | Taga et al. | |
| 4,671,155 A | 6/1987 | Goldinger | |
| 4,746,347 A | 5/1988 | Sensi | |
| 4,792,536 A | 12/1988 | Pecoraro et al. | |
| 4,952,423 A | 8/1990 | Hirata et al. | |
| 5,028,759 A | 7/1991 | Finley | |
| 5,030,593 A | 7/1991 | Heithoff | |
| 5,030,594 A | 7/1991 | Heithoff | |
| 5,059,295 A | 10/1991 | Finley | |
| 5,240,886 A | 8/1993 | Gulotta et al. | |
| 5,385,872 A | 1/1995 | Gulotta et al. | |
| 5,393,593 A | 2/1995 | Gulotta et al. | |
| 5,653,903 A | 8/1997 | Pinchok, Jr. et al. | |
| 5,796,055 A | 8/1998 | Benson, Jr. et al. | |
| 5,945,462 A | 8/1999 | Salamon | |
| 6,682,773 B2 | 1/2004 | Medwick et al. | |
| 7,335,421 B2 | 2/2008 | Thiel et al. | |
| 7,361,404 B2 | 4/2008 | Finley et al. | |
| 7,749,621 B2 | 7/2010 | Greenberg et al. | |
| 8,865,325 B2 | 10/2014 | Polcyn et al. | |
| 9,932,267 B2 | 4/2018 | Polcyn et al. | |
| 10,479,724 B2 | 11/2019 | Ganjoo et al. | |
| 2003/0228470 A1* | 12/2003 | Allaire | C03C 17/3405 428/426 |
| 2003/0232197 A1 | 12/2003 | Disteldorf | |
| 2005/0153064 A1 | 7/2005 | Lipson | |
| 2005/0181219 A1* | 8/2005 | Depauw | C03C 17/42 428/426 |
| 2006/0246302 A1 | 11/2006 | Brady et al. | |
| 2007/0231553 A1 | 10/2007 | Hartig et al. | |
| 2009/0044897 A1* | 2/2009 | Thomsen | C09D 5/008 156/150 |
| 2011/0177324 A1 | 7/2011 | Zagdoun et al. | |
| 2013/0019637 A1 | 1/2013 | Sol et al. | |
| 2013/0032281 A1 | 2/2013 | Van Den Berg et al. | |
| 2013/0299097 A1 | 11/2013 | Sjong | |
| 2014/0272453 A1 | 9/2014 | Polcyn et al. | |
| 2015/0072083 A1 | 3/2015 | Nebioglu et al. | |
| 2016/0194516 A1 | 7/2016 | Nadaud et al. | |
| 2017/0341977 A1 | 11/2017 | Polcyn et al. | |
| 2018/0118614 A1 | 5/2018 | Polcyn et al. | |
| 2019/0204480 A1 | 7/2019 | Thiel et al. | |
| 2021/0087104 A1 | 3/2021 | Heurtefeu et al. | |

FOREIGN PATENT DOCUMENTS

| | | |
|---|---|---|
| CN | 103702828 A | 4/2014 |
| CN | 104419318 A | 3/2015 |
| DE | 102015115030 A1 | 3/2017 |
| EP | 2735592 A1 | 5/2014 |
| EP | 3064479 A1 | 9/2016 |
| GB | 2302102 A | 1/1997 |
| WO | 2007052587 A1 | 5/2007 |
| WO | 2007092412 A3 | 8/2007 |
| WO | 2017144823 A1 | 8/2017 |
| WO | 2017144824 A1 | 8/2017 |
| WO | 2019122611 A1 | 6/2019 |
| WO | 2020161733 A1 | 8/2020 |
| WO | 2020234040 A1 | 11/2020 |

OTHER PUBLICATIONS

Polyethylene wax MSDS from Industrial Raw Materials (Year: 2015).*
Machine translation of WO 2007-052587 A1 (Year: 2007).*
"Acqua TM 240", Michelman, 2017, two pages.
"AQUACER 526", BYK Additives & Instruments, 2012, two pages.
"QUACER 1031", BYK Additives & Instruments, 2012, two pages.
"AQUACER 541", BYK Additives & Instruments, 2014, two pages.
"AQUACER 8500", BYK Additives & Instruments, 2015, two pages.
"Michem R Emulsion 48040M2", Michelman, 2017, two pages.
"Michem R Emulsion 62330", Michelman, 2017, two pages.
"Michem R Emulsion 160 PFP", Michelman, 2017, two pages.
"Michem R Guard 1350", Michelman, 2017, two pages.
"SPV CGP-series—Surface Protection Tapes", Nitto, 2019, two pages.
"Low-E Glass Products—Blending natural views with energy efficiency", Vitro Architectural Glass, 2019, pp. 1-6.
"Sungate 400 Glass—A passive low-e coating to help reduce heating expense", Vitro Architectural Glass, 2019, pp. 1-6.

* cited by examiner

BURN-OFF PROTECTIVE COATING

CROSS-REFERENCE TO RELATED APPLICATIONS

This application claims priority to U.S. Provisional Application No. 62/691,814, filed Jun. 29, 2018, the disclosure of which is hereby incorporated in its entirety by reference.

BACKGROUND OF THE INVENTION

Field of the Invention

The present invention is directed to protected substrates and to methods for protecting a substrate.

Description of Related Art

Large substrates, such as large glass sheets, often become damaged during shipment from the manufacturing plant to the customer site. This results in a substrate unsuitable for installation, causing chargebacks to the manufacturer and delay to the construction project. One way to protect large substrates from damage is to overlap or hold together using tape two smaller protective sheets positioned over the large substrates.

This approach includes certain drawbacks. For example, a small capillary tube can be formed at the seam of the two smaller protective sheets over which the tape is applied. The small capillary tube attracts water that induces corrosion at the site of the seam, which results in damage requiring chargebacks and project delays. Therefore, a protected substrate that prevents damage to a large substrate during shipment, including corrosion damage induced at the seam of overlaying protective sheets, is desired.

SUMMARY OF THE INVENTION

The present invention is directed to a protected substrate including: a planar substrate including a surface; and a burn-off temporary protective layer positioned over at least a portion of the surface, where the burn-off temporary protective layer includes a wax, a polyolefin, a polyester, a polycarbonate, a polyether, or some combination thereof, where the burn-off temporary protective layer is removable by a heat treatment process that does not substantially damage the surface.

The present invention is also directed to a method for protecting a substrate, including: providing a planar substrate including a surface and applying a material to form a burn-off temporary protective layer over at least a first portion of the surface, where the burn-off temporary protective layer includes a wax, a polyolefin, a polyester, a polycarbonate, a polyether, or some combination thereof, where the burn-off temporary protective layer is removable by a heat treatment process that does not substantially damage the surface.

The present invention is also directed to a method of removing a burn-off temporary protective layer from a coated substrate including: providing a coated substrate including a surface over a portion of which a burn-off temporary protective layer is applied, where the burn-off temporary protective layer includes a wax, a polyolefin (e.g., polyethylene, polypropylene, and the like), a polyester (e.g., polylactic acid, polycaprolactone, and the like), a polycarbonate (e.g., polyethylene carbonate, polypropylene carbonate, and the like), a polyether (e.g., polyoxymethylene and the like), or some combination thereof; and removing the burn-off temporary protective layer from the surface by burning the burn-off temporary protective layer to form an unprotected substrate, where the burn-off temporary protective layer is removable by a heat treatment process that does not substantially damage the surface.

The present invention is also directed to a protected substrate, including: a planar substrate including a surface; a temporary protective layer positioned over at least a portion of the surface; a first temporary protective sheet positioned over at least a first portion of the surface; and a second temporary protective sheet positioned over at least a second portion the surface, where an overlapping portion of the second temporary protective sheet overlaps an overlapping portion of the first temporary protective sheet at an overlap; where a gap is defined by the overlap between the second temporary protective sheet and a portion of the surface, where a portion of the temporary protective layer is positioned between the second temporary protective sheet and the portion of the surface.

The present invention is also directed to a protected substrate including: a planar substrate including a surface; a first temporary protective sheet positioned over a first portion of the surface; a second temporary protective sheet positioned over a second portion of the surface, where a third portion of the surface is not covered by the first temporary protective sheet and where the third portion of the surface is not covered by the second temporary protective sheet; and a temporary protective layer over at least the third portion of the surface, where the temporary protective layer is positioned directly beneath the first and/or second protective sheet and is positioned between the substrate and the first and/or second temporary protective sheet.

The present invention is also directed to a method for protecting a substrate including: providing a planar substrate including a surface; applying a material to form a temporary protective layer over at least a first portion of the surface; adhering a first temporary protective sheet over a second portion of the surface, where a portion of the first temporary protective sheet overlaps a first portion of the temporary protective layer; and adhering a second temporary protective sheet over a second portion of the temporary protective layer and over a third portion of the surface, where an overlap is formed between the first temporary protective sheet and the second temporary protective sheet, and where a gap is defined by the overlap between the second temporary protective sheet and the surface.

The present invention is also directed to a method of removing a temporary protective layer from a coated substrate including: providing a protected substrate including: a planar substrate including a surface; a temporary protective layer positioned over at least a portion of the surface; a first temporary protective sheet positioned over at least a first portion of the surface; and a second temporary protective sheet positioned over at least a second portion the surface, where an overlapping portion of the second temporary protective sheet overlaps an overlapping portion of the first temporary protective sheet at an overlap; where a gap is defined by the overlap between the second temporary protective sheet and a portion of the surface, where a portion of the temporary protective layer is positioned between the second temporary protective sheet and the portion of the surface; removing the first temporary protective sheet and/or the temporary protective sheet by peeling; and removing the temporary protective layer from the surface by burning, vaporizing, removing using a solvent, or peeling the temporary protective layer to form an unprotected substrate.

DESCRIPTION OF THE INVENTION

Figure 1:
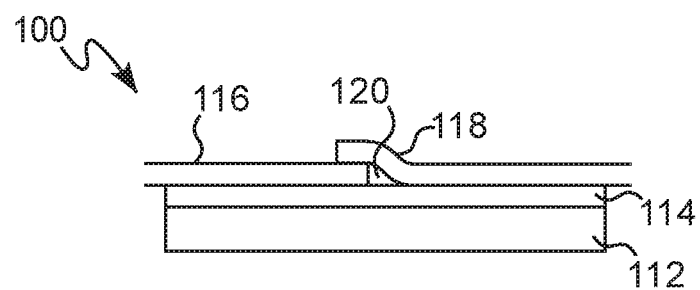
FIG. 1 shows a protected substrate according to a first non-limiting embodiment.

For purposes of the description hereinafter, the terms "end", "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

For purposes of the following detailed description, it is to be understood that the invention may assume various alternative variations and step sequences, except where expressly specified to the contrary. Moreover, other than in any operating examples, or where otherwise indicated, all numbers used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

With respect to layers of material described herein, the term "over" means farther from the substrate on which the material is positioned. For example, a second layer positioned "over" a first layer means that the second layer is positioned farther from the substrate than is the first layer. The second layer may be in direct contact with the first layer. Alternatively, one or more other layers may be positioned between the first layer and the second layer.

The terms "polymer" or "polymeric" include oligomers, homopolymers, copolymers, and terpolymers, e.g., polymers formed from two or more types of monomers or polymers.

The term "includes" is synonymous with "comprises".

Referring to FIGS. 1-11, the present invention is directed to protected substrates and methods for protecting a substrate as described herein.

Referring to FIG. 1, a protected substrate 100 includes a substrate 112. The substrate 112 may be made of any suitable material, and may be a substrate manufactured at a manufacturing facility and shipped to a customer site, such that the substrate 112 is susceptible to damage during shipping. In some non-limiting examples, the substrate 112 may include glass. The glass may include soda-lime glass. In other non-limiting examples, the substrate 112 may include metal or wood. The substrate may be made of any material capable of being damaged (e.g., scratched, corroded, etc.) during shipping. The substrate may be a coated substrate, having a functional coating layer over the bare substrate, such as coated glass. As used herein, the term "functional coating" refers to a coating which imparts a functional benefit to the surface beyond decoration of the surface. Non-limiting examples include coatings that impart an optical property, structural property, electrical property, hygienic property, thermal property, and/or physio-chemical property to the surface. Non-limiting examples of functional coatings include at least one of a low-e (low-emissivity) coating, a hydrophilic coating, a hydrophobic coating, an oleophilic coating, a low friction coating, an anti-microbial coating, an anti-fingerprint coating, an anti-fog coating, a self-cleaning coating, an easy-clean coating, a transparent conductive coating, and combinations thereof.

In some non-limiting embodiments, the substrate 112 may be a large substrate, such that multiple protective sheets are required to protect the entire surface of the substrate 112 during shipping. In some examples, the large substrates may have a length exceeding 100", such as at least 130", at least 160", at least 190", at least 220", at least 250". In some examples, the large substrates may have a width exceeding 100", such as at least 130", at least 160", at least 190", at least 220", at least 250". One non-limiting example of such a planar substrate includes a glass sheet.

In some non-limiting embodiments, the substrate 112 may be a planar substrate, such as a flat glass sheet. As used herein, a "planar substrate" refers to a flat substrate.

With continued reference to FIG. 1, the protected substrate 100 further includes a temporary protective layer 114 positioned over at least a portion of a surface of the substrate 112. The temporary protective layer 114 may be formed from a composition that, when applied to the surface of the substrate 112 and solidified, forms a layer thereover defined as the temporary protective layer 114. The temporary protective layer 114 may be positioned over at least a portion of a surface of the substrate 112, and in some non-limiting embodiments is positioned over at least the entire surface of the substrate 112. The temporary protective layer 114 may be applied over at least a portion of an edge of the substrate 112.

The temporary protective layer may include a material including wax, an organic oil (e.g., tung oil), a polyolefin, a poly(meth)acrylate, a polyester, an alkene, a polyethylene, a polypropylene, an emulsion thereof, or some combination thereof. The temporary protective layer may comprise polylactic acid (PLA), polyethylene carbonate (PEC), polypropylene carbonate (PPC), polycaprolactone, polyoxymethylene, polyethylene, polypropylene, or some combination thereof. The wax may include stearic acid, paraffin, carnauba, microcrystalline wax, polyethylene wax, or some combination thereof. Examples of wax emulsions include those available from Michelman, Inc. (Cincinnati, Ohio) (e.g., MGRD 1350, ML160, ME62330, Aqua240 PH90602L, ME48040M2) or BYK-Chemie GmbH (Wesel, Germany) (e.g., AQUACER 526, AQUACER 541, AQUACER 1031, AQUACER 8500). The wax emulsion may be a paraffin/polyethylene emulsion, an anionic polyamide emulsion, an anionic carnauba emulsion, an amine dispersed carnauba emulsion, an ethylene acrylic acid emulsion, a non-ionic microcrystalline emulsion, or some combination thereof. In some non-limiting examples, the temporary protective layer may include an alkane, an ester, or a carboxylic acid and have at least 40 wt. % carbon, based on the total weight of the temporary protective layer, such as at least 50 wt. %, at least 60 wt. %, at least 70 wt. %, at least 80 wt. %, or at least 90 wt. %.

The temporary protective layer 114 may include a material that when included in a composition and applied to a substrate and solidified to form a layer, the layer exhibits a water contact angle (WCA) (upon contact with water) of at least 60°, such as at least 70°, or at least 80°. The temporary protective layer 114 may include a hydrophobic material. A hydrophobic material is defined herein as a material that when included in a composition and applied to a substrate and solidified to form a layer, the layer exhibits a WCA (upon contact with water) of at least 90°, such as at least 100°, at least 110°, at least 120°, at least 130°, at least 140°, or at least 150°.

The temporary protective layer 114 may include a material having a melting point of at least 60° C., such as at least 70° C. or at least 80° C. The temporary protective layer may have a melting point of from 60° C.-350° C. The temporary protective layer 114 may include a material that, when solidified, is impermeable to water and other standard processing liquids, such as cooling agents, cutting oils, and the like. The temporary protective layer 114 may provide increased corrosion protection to the substrate 112 compared to the same substrate not including the temporary protective layer 114 positioned thereover.

In some non-limiting examples, the material applied to form the temporary protective layer may include an emulsion comprising a hydrophobic material, water, and a surfactant, and the surfactant may be a non-ionic surfactant or an ionic surfactant (e.g., a cationic or an anionic surfactant). The material applied to form the temporary protective layer 114 may be a thermoplastic or thermoset. The material applied to form the temporary protective layer 114 may include a material comprising a hydrophobic material dissolved in a solvent. The material applied to form the temporary protective layer may include a UV curable or heat curable material that, when applied to the surface of the substrate and exposed to a UV source or heat source, results in crosslinking of the applied material on the substrate. The material applied to form the temporary protective layer may include a two component (2K) resin that includes separate components that, when mixed with one another, react to crosslink the material upon application of the material to the surface of the substrate.

In some non-limiting examples, the material is heated until its temperature is at least the Tg of the material, and the material is applied at the temperature that is at least the Tg of the material. In other non-limiting examples the material is applied at a temperature below the Tg of the material and subsequently heated to a temperature suitable for the material to soften, such as above the Tg of the material. A non-limiting example includes Carnauba wax, such as ML160, available from Michelman, Inc. (Cincinnati, Ohio), which may require a heat treatment to a temperature above its Tg of 63° C., such as at least 70° C., at least 80° C., or at least 90° C.

The temporary protective layer 114 may be a layer removable from the surface of the substrate 112, even after the composition of the temporary protective 114 layer has been applied and solidified over the substrate 112 to form the temporary protective layer 114. The temporary protective layer 114 may be removed without substantially damaging the substrate 112 or rendering it unsuitable for its intended use (as hereinafter defined). The temporary protective layer 114 may be removed from the substrate 112 using any sufficient means, such as by burning, vaporizing, removing using a solvent, or peeling the temporary protective layer 114 from the substrate 112.

The temporary protective layer 114 may have a thickness ranging from 10 nm to 5,000 m, such as 10 nm to 1,000 m, 10 nm to 500 m, 0.5 μm to 100 m, 0.5 μm to 10 μm, 10 μm to 30 μm, or 50 μm to 100 m. The thickness should be sufficiently thick such that a continuous layer is formed. The temporary protective layer 114 may also be sufficiently thick so as to provide corrosion protection to the substrate 112. The temporary protective layer 114 may be thin enough such that upon burning, evaporating, or otherwise thermally decomposing of the temporary protective layer 114, substantial amounts of residue do not remain on the substrate 112. In this way, the temporary protective layer 114 may be burnable.

With continued reference to FIG. 1, the protected substrate 100 may further include a plurality of temporary protective sheets, including a first temporary protective sheet 116 and a second temporary protective sheet 118. The first temporary protective sheet 116 and the second temporary protective sheet 118 may be made of a plastic material, such as a polyethylene, polypropylene, polyester, polyethylene terephthalate, nylon, polyvinyl chloride, vinyl, polylactic acid, polyoxymethylene, or some combination thereof. In some non-limiting examples the second temporary protective sheet 118 may include a plastic film and a pressure sensitive adhesive applied on the plastic film. Examples of commercially available protective sheets include CGP-470, CGP-551, CGP-572, and/or CGP-591 protective films commercially available from Nitto Belgium NV (Genk, Belgium). The temporary protective sheets 116, 118 may include an adhesive layer that allows the temporary protective sheets 116, 118 to adhere to the layer over which they are placed. The adhesive layer may include a hydrophobic material exhibiting a water contact angle of at least 90°. In other examples, the temporary protective sheets 116, 118 do not include an adhesive layer and are positioned over the layer over which they are placed without adhering thereto using an adhesive.

The first and second temporary protective sheets 116, 118 may be positioned over the surface of the substrate 112. The first and/or second temporary protective sheets 116, 118 may be positioned over at least a portion of the temporary protective layer 114. The first and second temporary protective sheets 116, 118 may be separately formed plastic sheets positioned over the substrate 112. The temporary protective sheets 116, 118 may be positioned over the temporary protective layer 114 after the temporary protective layer 114 has been cooled to ambient temperature (after it has been solidified to form the temporary protective layer 114).

To form the protected substrate 100, the first and/or second temporary protective sheet 116, 118 may be positioned over the temporary protective layer 114 prior to shipping the protected substrate 100. Once the protected substrate 100 reaches its destination, the first and/or the second temporary protective sheets 116, 118 may be removed from the protected substrate 100, such that the removal (e.g., peeling or otherwise removing the sheets from the substrate) of the temporary protective sheets 116, 118 does not peel a majority (>50% by weight of the temporary protective layer 114) of the temporary protective layer 114 from the surface of the substrate 112. The removal of the first and/or second temporary protective sheets 116, 118 may leave substantially all (greater than 90% or greater than 95% by weight of the temporary protective layer 114) of the temporary protective layer 114 on the surface of the substrate 112. Thus, removal of the temporary protective sheets 116, 118 may leave the temporary protective layer 114 substantially intact over the surface of the substrate 112.

The first and second temporary protective sheets 116, 118 may be positioned over the substrate 112 in any number of arrangements to form the protected substrate 100, and FIGS. 1-11 show various non-limiting embodiments of protected substrates 100, 200, 300, 400, 500, 600, 700, 800, 900, 1000, 1100 each of which is described in more detail hereinafter. It will be appreciated that components in FIGS. 1-11 having the same last two digits in their element number correspond to components from the other FIGS. in the application and include the same characteristics of the corresponding components. For example, components 112, 212, 312, 412, 512, and the like all refer to the previously described substrate since all of these element numbers have the same last two digits (12).

Referring to FIG. 1, the temporary protective layer 114 is positioned over at least a portion of the surface of the substrate 112. The first and second temporary protective sheets 116, 118 are positioned over at least a portion of the surface of the substrate 112 and at least a portion of the temporary protective layer 114. The first and second temporary protective sheets 116, 118 overlap with each other to form an overlap portion. In the example shown in FIG. 1, the temporary protective layer 114 is applied over an entire surface of the substrate 112, but in other non-limiting examples, the temporary protective layer 114 may be selectively applied over less than the entire substrate 112 (e.g., only over a section at an overlap of the temporary protective sheets 116, 118) (see e.g., FIG. 7). Beneath the overlap portion formed by the first and second temporary protective sheets 116, 118, a gap 120 may be defined between the second temporary protective sheet 118 and a portion of the surface of the substrate 112. This gap 120 may be an air gap and may be free of material from the temporary protective layer 114, the first temporary protective sheet 116, and/or the second temporary protective sheet 118. In this way, the first and second temporary protective sheets 116, 118 are applied over the temporary protective layer 114, such that the gap 120 formed is free of material of the temporary protective layer 114, and the temporary protective layer 114, the first temporary protective sheet 116, and/or the second temporary protective sheet 118 does not fill the gap 120 between the first and second temporary protective sheet 116, 118. A portion of the temporary protective layer 114 is positioned between the second temporary protective sheet 118 and the portion of the surface of the substrate 112.

Figure 7:
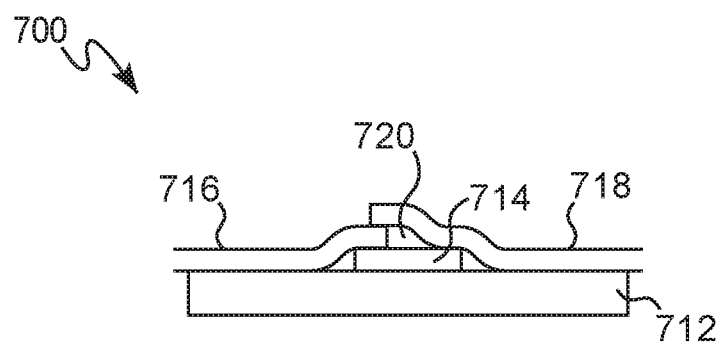
FIG. 7 shows a protected substrate according to a seventh non-limiting embodiment.
Figure 8:
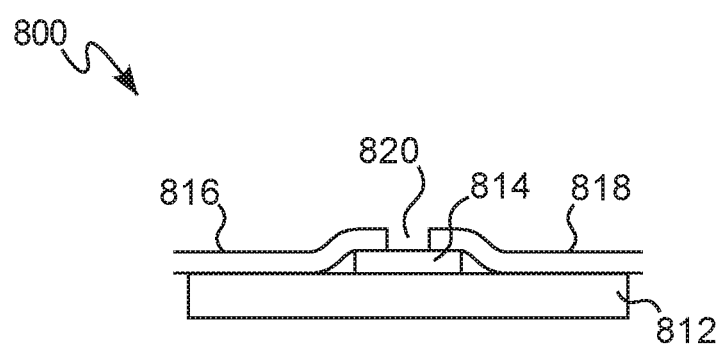
FIG. 8 shows a protected substrate according to an eighth non-limiting embodiment.
Figure 9:
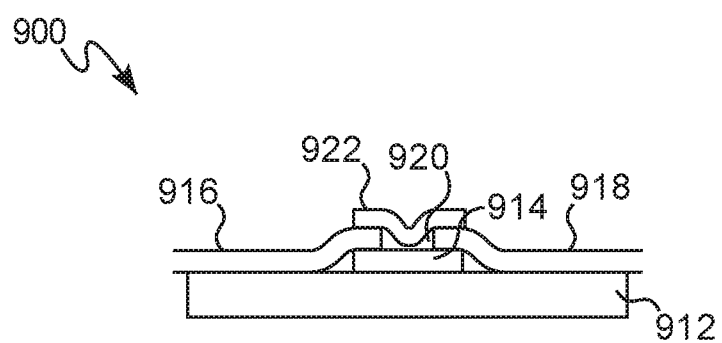
FIG. 9 shows a protected substrate according to a ninth non-limiting embodiment.
Figure 10:
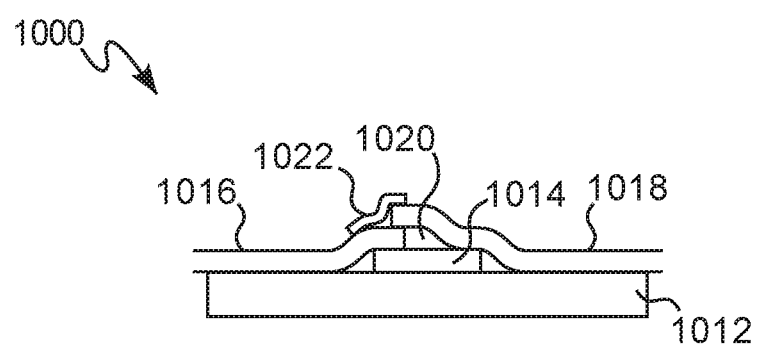
FIG. 10 shows a protected substrate according to a tenth non-limiting embodiment.

Referring to FIG. 10, the protected substrate 1000 may be identical to the protected substrates 100, 700 shown in FIGS. 1 and 7, respectively, except as follows. The protected substrate 1000 may further include tape 1022. The tape 1022 may hold the first temporary protective sheet 1016 and second temporary protective sheet 1018 together.

Figure 2:
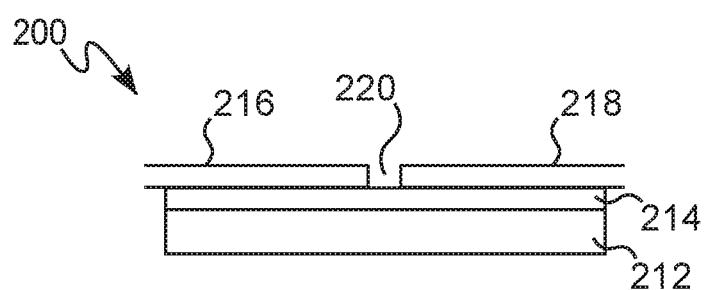
FIG. 2 shows a protected substrate according to a second non-limiting embodiment.

Referring to FIG. 2, the protected substrate 200 includes the substrate 212 having the temporary protective layer 214 applied over at least a first portion of the substrate 212. In the example shown in FIG. 2, the temporary protective layer 214 is applied over an entire surface of the substrate 212, but in other non-limiting examples, the temporary protective layer 214 may be selectively applied over less than the entire substrate 212 (e.g., proximate the gap 220 formed between the first and second temporary protective sheets 216, 218) (see e.g., FIG. 8). The first temporary protective sheet 216 may be positioned over at least a second portion of the substrate 212 and a first portion of the temporary protective layer 214. The second temporary protective sheet 218 may be positioned over at least a third portion of the substrate 212 and a second portion of the temporary protective layer 214 and may be spaced apart the first temporary protective sheet 216, such that the first and second temporary protective sheets 216, 218 are not in direct contact. A fourth portion of the surface of the substrate 212 is not covered by either temporary protective sheet 216, 218. The temporary protective layer 214 is positioned over this fourth portion (and may also be applied over the first and/or second portion of the substrate 212). The gap 220 may be formed between the first and second temporary protective sheets 216, 218, directly above the temporary protective layer 214 over the fourth portion.

With continued reference to FIG. 2, the protected substrate 200 may include the planar substrate 212 and a first portion thereof over which the temporary protective layer 214 is applied. The substrate 212 may include a second portion over which the first temporary protective sheet 216 is positioned. The substrate may include a third portion over which the second temporary protective sheet 218 is applied. The first portion is not covered by the temporary protective sheets 216, 218. The temporary protective layer 214 is positioned directly beneath the first and/or the second temporary protective sheet 216, 218 and between the substrate 212 and the first and/or the second temporary protective sheet 216, 218. The temporary protective sheets 216, 218 may or may not overlap with one another.

Figure 3:
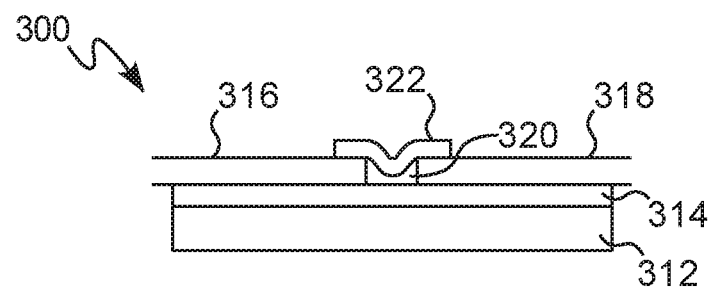
FIG. 3 shows a protected substrate according to a third non-limiting embodiment.

Referring to the protected substrate 300 of FIG. 3, the substrate 312, temporary protective layer 314, and first and second temporary protective sheets 316, 318 may be arranged as described in connection with FIG. 2. The protected substrate 300 may further include tape 322 positioned over the third portion of the surface of the substrate 312, a portion of the temporary protective layer 314, a portion of the first temporary protective sheet 316, and/or a portion of the second temporary protective sheet 318. The tape 322 may hold the first temporary protective sheet 316 and second temporary protective sheet 318 together. The gap 320 may be defined between the portion of the tape 322 positioned above the temporary protective layer 314 and the temporary protective layer 314 and between the temporary protective sheets 316, 318. The tape 322 from FIG. 3 may also be used in the protected substrate 100 of FIG. 1 to hold the first protective sheet 116 and second protective sheet 118 together. In the example shown in FIG. 3, the temporary protective layer 314 is applied over an entire surface of the substrate 312, but in other non-limiting examples, the temporary protective layer 314 may be selectively applied over less than the entire substrate 312 (e.g., only over a section beneath the tape 322) (see e.g., FIG. 9).

Figure 5:
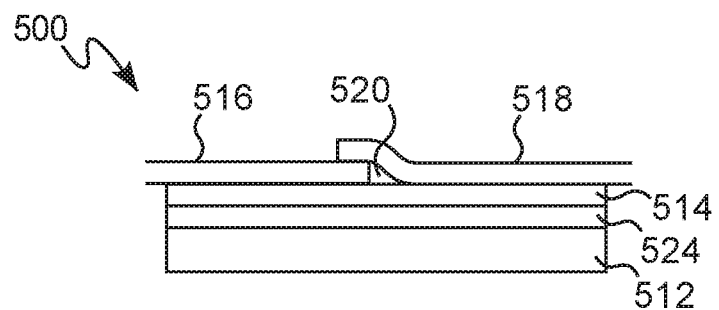
FIG. 5 shows a protected substrate according to a fifth non-limiting embodiment.

Referring to FIG. 5, the protected substrate 500 may further include a coating layer 524 positioned between the surface of the substrate 512 and the temporary protective layer 514. Multiple coating layers may be positioned over the substrate 512 and under the temporary protective layer 514, such that the temporary protective layer 514 protects the multi-layer coating. The coating layer 524 may, for example, include a low-E coating layer (or other functional coating layer as previously described). The coating layer 524 may be suitable for tempering after application to the substrate 512. The coating layer 524 may include a metal or metal oxide. The coating layer 524 may include a polymer. The coating layer 524 may include any temperable coating layer, for example, those disclosed in British Patent No. GB 2,302,102; U.S. Pat. Nos. 4,504,109; 4,952,423; 5,028,759; 5,059,295; 5,653,903; 7,749,621; 8,865,325; U.S. Published Patent Application No. 2014/0272453. The coating layer 524 may include coatings available under the tradename Solarban® or Sungate®, commercially available from Vitro Architectural Glass (Cheswick, Pa.). The first and second temporary protective sheets 516, 518 may be positioned over the temporary protective layer 514 and form the gap 520, as previously described. It will be appreciated that any of the previously-described embodiments of protected substrates may include a coating layer (e.g., a functional coating layer) positioned between the substrate and the temporary protective layer.

The present invention is also directed to a method of protecting the previously-described substrates by forming the previously-described protected substrates.

In one non-limiting embodiment, the method for protecting a substrate may include: providing a substrate comprising a surface; applying a material to form a temporary protective layer over at least a first portion of the surface; adhering and/or positioning a first temporary protective sheet over a second portion of the surface, where a portion of the first temporary protective sheet overlaps a first portion of the temporary protective; and adhering and/or positioning a second temporary protective sheet over a second portion of the temporary protective layer and over a third portion of the surface. An overlap may be formed between the first temporary protective sheet and the second temporary protective sheet, and the gap may be defined by the overlap between the second temporary protective sheet and the surface.

In one non-limiting embodiment, the method for protecting a substrate may include: providing a planar substrate including a surface; applying a material to form a temporary protective layer over at least a first portion of the surface; adhering and/or positioning a first temporary protective sheet over a second portion of the surface; and adhering and/or positioning a second temporary protective sheet over a third portion of the surface where a space is formed between the first temporary protective sheet and the second temporary protective sheet. The space may be over the first portion of the surface, and the temporary protective layer may be positioned directly beneath the first and/or second protective sheet and positioned between the substrate and the first and/or second temporary protective sheet.

The material applied to form the temporary protective layer may be applied over the surface of the substrate by any suitable method, such as spray coating, curtain coating, powder coating, brush coating, roll coating, inkjet printing, or some combination thereof. The material applied to form the temporary protective layer using any of these methods may include any of the previously-described materials, which upon solidification forms the temporary protective layer.

The method may include heating the material applied to form the temporary protective layer to a temperature sufficient to form a molten liquid prior to application of the material to the substrate. In some examples, this material may be applied to the surface of the substrate at a temperature above the melting point of the material. In some examples, the molten liquid may be applied to the surface of the substrate by bubbling a gas through the molten liquid (vapor deposition method) such that the material forms the temporary protective layer over the substrate. The gas bubbled through the molten liquid to deposit the material and to form the temporary protective layer may include an inert gas, such as nitrogen or helium. The inert gas may reduce the possibility of a chemical reaction with the material used to form the temporary protective layer.

A method of removing a temporary protective layer from a coated substrate may include: providing a protected substrate, comprising: a planar substrate comprising a surface; a temporary protective layer positioned over at least a portion of the surface; a first temporary protective sheet positioned over at least a first portion of the surface; and a second temporary protective sheet positioned over at least a second portion the surface, wherein an overlapping portion of the second temporary protective sheet overlaps an overlapping portion of the first temporary protective sheet at an overlap, where a gap is defined by the overlap between the second temporary protective sheet and a portion of the surface and a portion of the temporary protective layer is positioned between the second temporary protective sheet and the portion of the surface. The method may include removing the first temporary protective sheet and/or the temporary protective sheet by peeling. The method may include removing the temporary protective layer from the surface by burning, vaporizing, removing using a solvent, or peeling the temporary protective layer to form an unprotected substrate. The protected substrate may be heated to a temperature of up to 1000° C. to remove the temporary protective layer from the surface.

Figure 11:
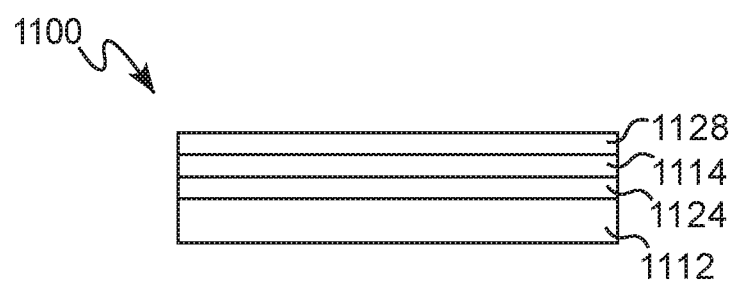
FIG. 11 shows a protected substrate according to an eleventh non-limiting embodiment.

Referring to FIG. 11, the protected substrate 1100 may include the substrate 1112, a temporary protective layer 1114 positioned over at least a portion of the surface of the substrate 1112, and a burnable sheet 1128 positioned over at least a portion of the temporary protective layer 1114, and optionally in direct contact with the temporary protective layer 1114. The burnable sheet 1128 may include polyethylene, polypropylene, polyacrylate, polymethyl methacrylate, polylactic acid, polycaprolactone and polyoxymethylene, or some combination thereof. The burnable sheet 1128 may optionally include an adhesive. The burnable sheet 1128 may be made of a material that allows at least some of the UV light to pass through it so as to cure the temporary protective layer 1114 arranged thereunder. UV radiation may be applied to the protected substrate 1100 using a UV source, and the UV radiation may cure the temporary protective layer 1114, which may also function as an adhesive to adhere the burnable sheet 1128 to the substrate 1112. Both the temporary protective layer 1114 and the burnable sheet 1128 may burn away during a tempering process. Any of the previously-described materials of the temporary protective layer 1114 may be used, which may have the previously-described thickness. The burnable sheet 1128 may have a thickness of 0.1-10 mils, such as 0.5-5 mils or 0.5-2 mils. The burnable sheet 1128 may be an outermost sheet over the substrate 1112. The temporary protective layer 1114 and the burnable sheet 1128 may be made of a burnable material. The protected substrate 1100 may include a coating layer 1124, as previously described.

As used in this disclosure, the term "burnable" refers to a material that will burn, evaporate, or otherwise thermally decompose from the substrate, without interacting with the substrate or otherwise substantially damaging (as defined hereinafter) the aesthetics or performance of the substrate (including any coating thereover). Burnable materials would burn, evaporate or otherwise thermally decompose at least when the temperature of the substrate is from 500° C. to 1000° C. It is anticipated that the burnable material will burn, evaporate, or otherwise thermally decompose before the substrate reaches a temperature of 1000° C., such as a temperature of 900° C., 800° C., 700° C., 650° C. or 600° C. The heat treatment process may be conducted in a furnace having a temperature of up to 1200° C., such as up to 1100° C., up to 1000° C., up to 900° C., up to 800° C., up to 700° C., or up to 650° C. The furnace may operate at a temperature of 700° C., such that the substrate reaches a temperature of 640° C. for the burn-off temporary protective layer (described hereinafter) to be removed during the heat treatment process. In some non-limiting The burnable material may be removed during standard heat treatment processes, such as tempering, heat strengthening, or bending or during a heat treatment specifically performed to remove the burnable material without adversely affecting the substrate, as previously described. In some non-limiting examples, the burnable material may be removed during a standard tempering procedure in which the tempering ovens operate in the range of 500° C.-1000° C., such as 600° C.-800° C., or such a 650° C.-750° C.

Figure 4:
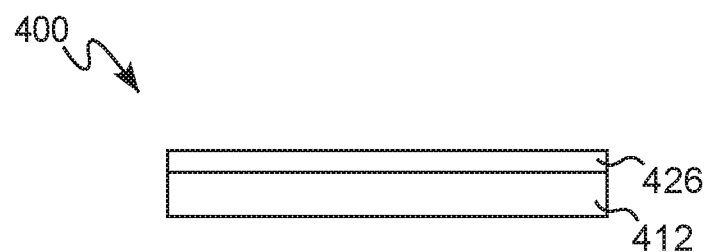
FIG. 4 shows a protected substrate according to a fourth non-limiting embodiment.
Figure 6:
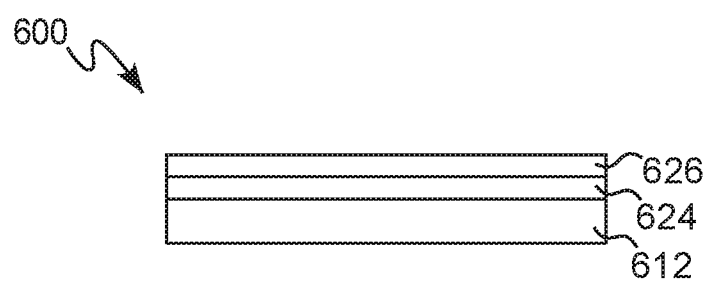
FIG. 6 shows a protected substrate according to a sixth non-limiting embodiment.

Referring to FIG. 4, the protected substrate 400 may include the substrate 412 and a burn-off temporary protective layer 426 positioned over at least a portion of the surface of the substrate 412. Referring to FIG. 6, the protected substrate 600 may include the substrate 612 and the burn-off temporary protective layer 626 positioned over at least a portion of the surface of the substrate 612 (like in FIG. 4), and may further include coating layer 624 between the substrate 612 and the burn-off temporary protective layer 626. As used herein, the term "burn-off temporary protective layer" means a layer that is removable by a heat treatment process that does not substantially damage the surface.

The burn-off temporary protective layer 626 may include a wax, a polyolefin, a polyester, a polycarbonate, a polyether, or some combination thereof. The burn-off temporary protective layer 626 may include polylactic acid (PLA), polyethylene carbonate (PEC), polypropylene carbonate (PPC), polycaprolactone, polyoxymethylene, polyethylene, polypropylene, or some combination thereof. The burn-off temporary protective layer 626 may include polylactic acid (PLA) and methyl acetate. The burn-off temporary protective layer 626 may optionally include an adhesive.

The burn-off temporary protective layer 626 may comprise a material having a melting point of from 60° C.-350° C.

The burn-off temporary protective layer 626 may have a thickness of 10 nm to 5000 m, such as 1 μm to 100 m, such as 5 μm to 50 μm, such as from 5 μm to 20 μm. The burn-off temporary protective layer 626 may be an outermost layer over the substrate 612.

The burn-off temporary protective layer 626 may be removed by burning (or other heat treatment process) without substantially damaging the surface. As used herein, "substantially damaging" is defined as a change that is detrimental to the function or aesthetics of the substrate that constitutes any unwanted change in a substrate property that would make the substrate unacceptable for its intended purpose. For example, substantially damaging the surface may include substantial discoloration to the surface from the heat treatment process. In other applications where a heating step is part of the standard procedure, the damage may be defined as an unwanted color change due to the presence of burn-off coating as compared to a similar sample that is heated without the burn-off coating. As used here, substantial discoloration means a color change (DECMC) of more than 3 units, more than 2 units, or more than 1 unit compared to the color of a similar substrate processed without the burn-of coating. DECMC (CIELAB) may be measured using an integrating sphere with D65 Illumination, 10° observer with specular component included according to ASTM Designation: D 2244-05 unless otherwise stated. Other examples of substantial damage include or could be induced by a change in surface roughness, a change in the oxidation state of the surface, or a change in surface energy due to the presence of burn-off coating during the heat treatment process, or an unwanted reaction between the burn-off temporary protective layer and the substrate during the heat treatment process. Substantial damage may include any detrimental change to a functional coating disposed over the substrate beneath the burn-off temporary protective layer (e.g., an anti-microbial functional coating that no longer sanitizes the surface after the heat treatment process, a hydrophobic functional coating that loses its hydrophobicity after the heat treatment process, a color change to the functional coating discernable by the human eye (e.g., DECMC>3, 2, or 1) compared to a substrate heated without the burn-off temporary protective layer.

The burn-off temporary protective layer 626 may be removable by burning at a temperature of up to 1000° C., such as up to 900° C., up to 800° C., up to 700° C., up to 600° C., or up to 500° C. The burn-off temporary protective layer 626 may be removed during standard heat treatment processes, such as tempering, heat strengthening, or bending or during a heat treatment specifically performed to remove the burnable material without substantially damaging the substrate 612. In one non-limiting examples, the burnable material may be removed during a standard tempering procedure in which the tempering furnaces operate in the range of 500° C.-1000° C. The protected substrate 600 may include an optional coating layer 624, as previously described.

With continued reference to FIGS. 4 and 6, the substrate may not include any temporary protective sheet over a surface of the substrate, as the burn-off temporary protective layer may sufficiently protect the substrate as the outermost layer.

In some non-limiting examples, the burn-off temporary protective layer may be positioned over the entire surface of the substrate. The burn-off temporary protective layer may also cover at least a portion of the edge of the substrate.

A method for protecting the substrate may include: providing the planar substrate comprising a surface and applying a material to form the burn-off temporary protective layer over at least a first portion of the surface. The burn-off temporary protective layer may be applied over the substrate using any of the previously describe methods of applying the temporary protective layer. The method may further include preparing the material by dissolving polylactic acid (PLA) in methyl acetate, where the material is applied to form the burn-off temporary protective layer by curtain coating.

A method of removing a burn-off temporary protective layer from a coated substrate, may include: providing a coated substrate comprising a surface over a portion of which a burn-off temporary protective layer is applied and removing the burn-off temporary protective layer from the surface by burning the burn-off temporary protective layer to form an unprotected substrate. The coated substrate may be heated to a temperature of up to 1000° C. to remove the burn-off temporary protective layer from the surface.

The following examples are presented to demonstrate the general principles of the invention. The invention should not be considered as limiting to the specific examples presented.

EXAMPLE 1

Acrylite Coating

An acrylite based clear coating, RUST-OLEUM Crystal Clear Top coat, product number 248644, was spin coated at 1250 RPM for 30 seconds onto Solarban® 60VT, Solarban® 70VT, Solarban® R100, and other Solarban® coated glass. The sample was then sealed into an accelerated aging chamber at 50° C./100% RH. After 60 hours, the acrylite coating prevented corrosion on the sample where the control, with no coating, was heavily corroded. Additionally, on a fresh sample, a few drops of water were placed onto the coated surface and then sealed with CGP-551 protective film (Nitto Belgium NV (Genk, Belgium)). After 3 days of storage at room temperature the samples were heat treated by rapidly raising the substrate to 600° C. and then allowing it to cool at ambient temperatures and compared to the control. The acrylite coating successfully prevented corrosion where the control, with no coating, was heavily corroded.

EXAMPLE 2

Wax Coating Using a Smear Application

Warm Gulf paraffin wax was smeared in a 1 inch strip across a 4 inch×4 inch sample of Low-E coated Solarban® 60VT, Solarban® 70VT, Solarban® R100, and other Solarban® coated glass. Then, two narrow pieces of Nitto CGP-551 protective film (Nitto Belgium NV (Genk, Belgium)) were applied manually over the wax so that the seam of the film was over the top of the wax and parallel to the wax. The samples were then soaked in 40° C. water for 2 minutes and then left out in ambient conditions for 2-3 days. Samples were then heat treated by rapidly raising the substrate to 600° C. and then allowing it to cool at ambient temperatures and compared to a control. Waxed samples had no corrosion where control samples, with no wax, showed corrosion in the seam of the film. The experiment was repeated with "Refined Carnauba Wax" from Fisher Scientific using an accelerated aging chamber set to 40° C. and 95% RH for 1 day. Again, samples with wax prevented corrosion where the control, with no coating, was heavily corroded.

EXAMPLE 3

Tung Oil Using a Spin Coat Application

Tung oil was spin coated at 1250 RPM for 30 seconds onto a piece of Solarban® 60VT, Solarban® 70VT, Solarban® R100, and other Solarban® coated glass. After application the oil was oxidized via exposure to a UV light source, resulting in a hardened opaque coating. The sample was then placed in at 60° C./95% RH humidity accelerated corrosion chamber for 3 days. Last the coated sample and a non-coated control were heat treated by rapidly raising the substrate to 600° C. and then allowing it to cool at ambient temperatures and compared. The tung oil successfully prevented corrosion on the sample where the control, with no coating, was heavily corroded

EXAMPLE 4

Wax Emulsion

Emulsions of Fischer Tropsch wax and Carnauba wax from Michelman, Michem Dispersion 47, D471, ML260, and Cerafak 127N from BYK, were applied to Solarban® 60VT, Solarban® 70VT, Solarban® R100, and other Solarban® coated glass. After drying they were placed in a 60° C./95% RH humidity accelerated corrosion chamber for 3 days. The samples were then heat treated by rapidly raising the substrate to 600° C. and then allowing it to cool at ambient temperatures and compared to a control. Both the Fisher Tropsch wax and the Carnauba wax prevented corrosion on the sample where the control, with no coating, was heavily corroded.

EXAMPLE 5

Heated Emulsion Application

Emulsions of Carnauba wax and polyethylene wax from Michelman, Michem® Dispersion 471, Michem® Guard 1350, ML260 and from BYK, Aquacer 1031 and Aquacer 8500, were sprayed onto Solarban® 60VT, Solarban® 70VT, Solarban® R100, and other Solarban® coated glass. After drying, they were then heated for 5 minutes in a 200° C. oven to heat the particles left as the emulsion dried and created a fully fused film. A few drops of water were then placed onto the top of the samples and sealed to the surface with Nitto CGP-551 protective film (Nitto Belgium NV (Genk, Belgium)). After 3 days the samples were heat treated by rapidly raising the substrate to 600° C. and then allowing it to cool at ambient temperatures and compared to a control. Both the polyethylene wax and the Carnauba wax prevented corrosion on the sample where the control, with no coating, was heavily corroded.

EXAMPLE 6

Wax Vapor Deposition

Using a heated bubbler with nitrogen flow, Microcrystalline Wax, from "Making Cosmetics" Microcrystalline Wax Pastilles was applied to the surface of Solarban® 60VT, Solarban® 70VT, Solarban® R100, and other Solarban® coated glass. The resulting wax film changed the water contact angle from about 20° on low-E coated glass to greater than 105° on similar samples coated with wax.

EXAMPLE 7

Molten Polyethylene Using a Dip Coating Application

Pieces of Solarban® 60VT, Solarban® 70VT, Solarban® R100, and other Solarban® coated glass were dip coated in molten Sigma Aldrich Medium Density Polyethylene, product number 332119, resulting in samples with a thickness gradient, ranging from no coating to very thin, and to very thick polyethylene coating all on the same piece. The sample was placed in a 60° C./95% RH accelerated corrosion chamber for 3 days and then heat treated by rapidly raising the substrate to 600° C. and then allowing it to cool at ambient temperatures. The polyethylene coating successfully prevented corrosion on the sample where the control, with no coating, was heavily corroded. This was true at all thicknesses on the sample.

EXAMPLE 8

Molten Spray Coating

Solarban® 70VT coated glass was spray coated with Multiwax® 180-M Microcrystalline wax from Sonneborn and Sigma Aldrich Medium Density Polyethylene, product number 332119, using a Valco Melton heated spray unit. The spray pattern covered a band about 1 inch wide across the substrate. Overspray covered another 2 or 3 inches on each side. The glass was then exposed to accelerated corrosion testing, including a more aggressive and faster test (60° C./95% RH for 3 days) and a more gentle but slower test (45° C./95% RH for 10 days). For both conditions, areas covered by the polymers were protected from corrosion and corrosion was also reduced in the overspray area. Glass that was outside the spray zone was heavily corroded. If the environment were heated properly, other polymers with higher melting temperatures, like polypropylene, could be applied with other spray systems or with a contact curtain coater.

EXAMPLE 9

Solution of Polyethylene and Polypropylene in Xylene

Blends of Sigma Aldrich, POLYETHYLENE, MEDIUM DENSITY, product number 332119, POLYETHYLENE, LOW DENSITY, product number 428043, and blends of POLYPROPYLENE, AMORPHOUS, product number 428175, POLYPROPYLENE, ISOTATIC, AVERAGE MW 12,000, product number 428116, were dissolved in xylene at high temperatures. The resulting solutions were then applied to Solarban® 60VT, Solarban® 70VT, Solarban® R100, and other Solarban® coated glass. The solutions were applied using a drawdown bar and the resulting samples were placed in an accelerated corrosion chamber at 60° C./95% RH for 3 days. The polyethylene and polypropylene coatings successfully prevented corrosion on the sample where the control, with no coating, was heavily corroded.

EXAMPLE 10

Plant Scale Molten Spray Coating with Nitto Film

Glass was sprayed with molten Multiwax® 180-M Microcrystalline wax from Sonneborn as it exited a Vitro MSVD coater. The glass was then aligned and Nitto CGP-551 protective film (Nitto Belgium NV (Genk, Belgium)) was applied so that the seam of the film was both parallel to the wax, and on top of the wax. 12 inch×12 inch samples were collected and were exposed to various treatments to induce corrosion. One set was placed in a 95% RH chamber with cycling temperatures (25° C. to 40° C.). This caused water to condense on the samples. The second set was soaked in a 40° C. water bath for 2 minutes before being placed into a static 95% RH/45° C. chamber. The third set was put through a glass washer and then placed into a static 95% RH/45° C. chamber. The last set received no pretreatment before being placed into a static 95% RH/45° C. chamber. In all four cases, the glass with the wax under the seam had less or no corrosion compared to the control that had film but no wax.

EXAMPLE 11

UV Cure Coating

Several simplified UV-cure coatings were formulated by PPG Industries, Inc. (Pittsburgh, Pa.) for testing. The resins were spin coated to Solarban® 60VT, Solarban® 70VT, Solarban® R100, and other Solarban® coated glass at 1250 RPM for 30 seconds, cured with a UV light source and then samples were placed in a 60° C./95% RH accelerated corrosion chamber for 3 days. Several of these experimental coatings successfully prevented corrosion where the control, with no coating, was heavily corroded. These coatings burned off cleanly upon heating the substrates to 600° C.

EXAMPLE 12

Molten Coating Applied by Drawdown Bar

Blends of Sigma Aldrich POLYPROPYLENE, AVERAGE MW CA. 12,000, product number 440752, POLYPROPYLENE, AMORPHOUS, product number 428175, POLYPROPYLENE, ISOTATIC, AVERAGE MW 12,000, product number 428116, POLYPROPYLENE, ISOTATIC, AVERAGE MW 250,000, product number 427888, were melted and then applied to Solarban® 60VT, Solarban® 70VT, Solarban® R100, and other Solarban® coated glass using a drawdown method. The thickness of the coatings were measured using a stylus profilometer to be about 50 µm. The samples were then placed in a 60° C./95% RH accelerated corrosion chamber for 3 days. The polypropylene coatings successfully prevented corrosion on the sample where the control, with no coating, was heavily corroded. These coatings burned off cleanly upon heating the substrates to 600° C.

EXAMPLE 13

Hot Melt Waxes

Polymers with a melting point of less than 130° C., such as microcrystalline wax from "Making Cosmetics" Microcrystalline Wax Pastilles, Gulf paraffin wax, beeswax, "Refined Carnauba Wax" from Fisher Scientific, and Sigma Aldrich, POLYETHYLENE, MEDIUM DENSITY, product number 332119, were melted and applied to glass with a drawdown bar. The resulting coatings burned off of Solarban® 60VT, Solarban® 70VT, Solarban® R100, and other Solarban® coated glass cleanly, and had excellent protection from corrosion.

EXAMPLE 14

Waxes in Solvent

Polymers with a melting point of less than 130° C., such as microcrystalline wax from "Making Cosmetics" Microcrystalline Wax Pastilles, Gulf paraffin wax, beeswax, "Refined Carnauba Wax" from Fisher Scientific, and Sigma Aldrich, POLYETHYLENE, MEDIUM DENSITY, product number 332119, were dissolved in various solvents such as xylene, toluene, methyl ethyl ketone, methyl acetate, ethyl acetate, isopropanol, and dichloroethane. The resulting solutions were applied to the substrate via drawdown bar. Resulting coatings burned off of Solarban® 60VT, Solarban® 70VT, Solarban® R100, and other Solarban® coated glass cleanly and had good corrosion resistance.

EXAMPLE 15

Polypropylene in Solvent

Polypropylene (PPL) was dissolved in solvents, such as xylene, to make a low viscosity solution. The resulting coatings, applied by drawdown bar, burned off of Solarban® 60VT, Solarban® 70VT, Solarban® R100, and other Solarban® coated glass cleanly. The tacticity of the polymer chain created differences in the solubility and in the final coating. Amorphous PPL formed a continuous coating that was tacky to the touch. Isotactic polypropylene also forms a continuous coating but was brittle and cracked easily. Dissolving PPL into solvents allowed for blending of different varieties in various ratios and then applying with a drawdown bar to make coatings with variable tackiness and brittleness. These coatings burned off of Solarban® products cleanly. The more atactic PPL in the blend, the more flexible it was and the better it protected from cracking. This meant enhanced corrosion protection and mechanical strength, up to a point. Too much of the amorphous PPL made the coating tacky and soft. The optimal blends were tested for resistance to transit damage, mechanical damage, and corrosion resistance. Other solvents that could be tried include methyl tert-butyl ether, tert-butyl acetate, benzene, toluene, xylene, dimethyl carbonate, methyl ethyl ketone, and others.

EXAMPLE 16

Polypropylene of Various Molecular Weights

Polypropylene can come in many different molecular weights. For isotactic polypropylene, the higher the molecular weight, the lower its solubility. A 10% solution of PPL with 250,000 MW did not dissolve in xylene, whereas a 10% solution of PPL with 12,000 MW dissolved and made a low viscosity solution suitable for drawdown coating.

EXAMPLE 17

Polypropylene Carbonate

QPAC 40 Polypropylene carbonate (PPC) (from Empower Materials (New Castle, Del.)) burned cleanly off of Solarban® 60VT, Solarban® 70VT, Solarban® R100, and other Solarban® coated glass. Different grades of PPC with varying molecular weight dissolved in methyl acetate to form solutions of 17% to 38% PPC. The viscosities of the solutions at 17% varied from 110-1040 cp. The solutions were then applied to form coatings varying between 6 μm to 20 μm thick. The coatings had very good mechanical strength and burned off cleanly on Solarban® 60VT, Solarban® 70VT, Solarban® R100, and other Solarban® coated glass. Other solvents that may be used include methyl tert-Butyl ether, tert-Butyl acetate, benzene, toluene, xylene, dimethyl carbonate, methyl ethyl ketone, and others. Other similar polymers such as polyethylene carbonate (e.g., QPAC 25 (from Empower Materials (New Castle, Del.))) may also result in burnable coatings with good mechanical strength.

EXAMPLE 18

Different Grades of Polylactic Acid

Polylactic Acid (PLA) from Natureworks was dissolved into solvents to make a fluid that was applied to Solarban® 60VT, Solarban® 70VT, Solarban® R100, and other Solarban® coated glass with various application methods such as drawdown, spin-coating, curtain-coating, flow coating, and dip coating. The resulting PLA coatings burned off cleanly on Solarban® 60VT, Solarban® 70VT, Solarban® R100, and other Solarban® coated glass. Different varieties of PLA on different Solarban® products have different maximum thicknesses as determined by visible residue after burning. In addition some Solarban® coatings have a higher sensitivity to residues most likely due to their unique optical properties. Different varieties of PLA also have different solubility. For instance NATUREWORKS 2003D had a maximum solubility of 33% in methyl acetate, whereas NATUREWORKS 2500 HP has a maximum solubility of 8% in methyl acetate. Different grades also have different viscosities in solution which might affect their application method.

EXAMPLE 19

Polylactic Acid in Different Solvents

Polylactic acid (PLA) was dissolved with a variety of solvents including acetone, methyl acetate, xylene, and methylene chloride. Different solvents gave the resulting coating different properties. When PLA was dissolved in acetone it provided a coating with inferior mechanical and aesthetic properties when compared to coatings made with a similar grade of PLA dissolved in methyl acetate. Other solvents that may be used include methyl tert-butyl ether, tert-butyl acetate, benzene, toluene, dimethyl carbonate, methyl ethyl ketone, and others.

EXAMPLE 20

Polylactic Acid Coatings Applied by Drawdown Method

PLA solutions were applied to glass substrates with a drawdown bar. This contact application method allowed for uniform coatings between 1 μm and 40 μm thick. The substrates included, clear glass, tinted glass, low iron glass, Solarban® 60 coated glass, Solarban® 70 coated glass, Solarban® 90 coated glass, Solarban® R100 coated glass, and Solarban® 67 coated glass. In addition, experimental samples were made with different top coats including silicon nitride, silicon alumina nitride, silicon alumina oxide, silicon aluminum oxynitride. Various substrates and varieties of PLA had maximum allowable thicknesses as determined by the lack of visible residue after burning. The resulting coatings had good mechanical strength and good protection against transit damages.

EXAMPLE 21

Polylactic Acid Coatings Via Curtain Coating

PLA solutions were applied to glass substrate using a slot die applicator (Nordson EDI, Ultracoat® IV). The PLA solutions were 12% in methyl acetate and were pumped through a 1400 mm slot die with a lip opening of 5 μm to 250 m. The die was raised 3 inches above the surface of the glass and the glass moved at a rate of 80 in/sec under the curtain. This resulting coating was about 9 μm thick and burned cleanly on Solarban® 60, clear glass, and Solarban® R100. The curtain coating method increased the adhesion of the coating as compared to drawdown application and the resulting coatings had good mechanical strength and good protection against transit damages.

EXAMPLE 22

Oils in Polylactic Acid

In order to increase the corrosion resistance of the Polylactic acid, different oils, such as cottonseed, soybean, corn, rapeseed, linseed, castor, sesame, lard, and olive oil, and waxes, such as carnauba and medium density polyethylene, were added to the PLA in solution at 10% by weight of the PLA and then applied to the Solarban® products. The oils all help prevent corrosion of the Solarban® products without noticeable degradation to the PLA Coating. The waxes in the form of emulsions or other application techniques that could form more uniform coatings would also help enhance the corrosion resistance of PLA.

EXAMPLE 23

Additives to Reduce Mobility of Molten Polylactic Acid

Polylactic acid is a thermoplast, meaning that it can potentially bead or agglomerate on the surface of the glass before burning. Using a UV cure additive to trap the PLA in place reduces the movement of the PLA on the surface. This reduced motility may be used to allow the PLA to be put on in a thicker layer. Other UV cure additives and thermosets could be used to restrict movement in the same way.

The present invention further includes the subject matter of the following clauses.

Clause 1: A protected substrate, comprising: a planar substrate comprising a surface; a temporary protective layer positioned over at least a portion of the surface; a first temporary protective sheet positioned over at least a first portion the surface; and a second temporary protective sheet positioned over at least a second portion the surface, wherein an overlapping portion of the second temporary protective sheet overlaps an overlapping portion of the first temporary protective sheet at an overlap; wherein a gap is defined by the overlap between the second temporary protective sheet and a portion of the surface, wherein a portion of the temporary protective layer is positioned between the second temporary protective sheet and the portion of the surface.

Clause 2: The protected substrate of clause 1, wherein the temporary protective layer is removable by burning, vaporizing, removing using a solvent, or peeling.

Clause 3: The protected substrate of clause 1 or 2, wherein the planar substrate comprises glass.

Clause 4: The protected substrate of any of clauses 1-3, wherein the planar substrate comprises metal or wood.

Clause 5: The protected substrate of any of clauses 1-4, further comprising a functional coating positioned over the surface and between the surface and the temporary protective layer.

Clause 6: The protected substrate of clause 5, wherein the functional coating comprises a low-E coating layer.

Clause 7: The protected substrate of any of clauses 1-6, wherein the temporary protective layer comprises a material comprising a wax, a polyolefin, a poly(meth)acrylate, a polyester, an alkene, or some combination thereof.

Clause 8: The protected substrate of clause 7, wherein the wax comprises a polyethylene wax.

Clause 9: The protected substrate of any of clauses 1-8, wherein the temporary protective layer comprises a thickness of at least 10 nm and at most 5,000 μm.

Clause 10: The protected substrate of any of clauses 1-9, wherein the first temporary protective sheet and/or the second temporary protective sheet is configured to be removed from the protected substrate, wherein removal of the first temporary protective sheet and/or the second temporary protective sheet from the protected substrate does not peel a majority of the temporary protective layer from the surface.

Clause 11: The protected substrate of any of clauses 1-10, wherein the temporary protective layer comprises a material having a melting point of at least 60° C.

Clause 12: The protected substrate of any of clauses 1-11, wherein the temporary protective layer comprises a hydrophobic material.

Clause 13: The protected substrate of any of clauses 1-12, wherein when the temporary protective layer contacts water, the temporary protective layer exhibits a water contact angle of at least 60°.

Clause 14: The protected substrate of any of clauses 1-13, wherein the temporary protective layer is water impermeable.

Clause 15: The protected substrate of any of clauses 1-14, wherein the temporary protective layer provides increased corrosion protection to the substrate, compared to the same substrate not including the temporary protective layer.

Clause 16: The protected substrate of any of clauses 1-15, further comprising tape positioned between the first temporary protective sheet and the second temporary protective sheet.

Clause 17: A protected substrate, comprising: a planar substrate comprising a surface; a first temporary protective sheet positioned over a first portion of the surface; a second temporary protective sheet positioned over a second portion of the surface, wherein a third portion of the surface is not covered by the first temporary protective sheet and wherein the third portion of the surface is not covered by the second temporary protective sheet; and a temporary protective layer over at least the third portion of the surface, wherein the temporary protective layer is positioned directly beneath the first and/or second protective sheet and is positioned between the substrate and the first and/or second temporary protective sheet.

Clause 18: The protected substrate of clause 17, further comprising a tape positioned over at least the third portion of the surface, a portion of the first temporary protective sheet and a portion of the second temporary protective sheet.

Clause 19: The protected substrate of clause 18, wherein a portion of the tape is positioned over at least a portion of the temporary protective layer.

Clause 20: The protected substrate of clause 19, wherein a gap is defined between the portion of the tape positioned over the portion of the temporary protective layer, and the portion of the temporary protective layer.

Clause 21: The protected substrate of any of clauses 17-0, wherein the temporary protective layer is removable by burning, vaporizing, removing using a solvent, or peeling.

Clause 22: The protected substrate of any of clauses 17-1, wherein the planar substrate comprises glass.

Clause 23: The protected substrate of any of clauses 17-2, wherein the planar substrate comprises metal or wood.

Clause 24: The protected substrate of any of clauses 17-3, further comprising a functional coating positioned over the surface and between the surface and the temporary protective layer.

Clause 25: The protected substrate of clause 24, wherein the functional coating comprises a low-E coating.

Clause 26: The protected substrate of any of clauses 17-5, wherein the temporary protective layer comprises a material comprising a wax, a polyolefin, a poly(meth)acrylate, a polyester, an alkene, or some combination thereof.

Clause 27: The protected substrate of clause 26, wherein the wax comprises a polyethylene wax.

Clause 28: The protected substrate of any of clauses 17-7, wherein the temporary protective layer comprises a thickness of at least 10 nm and at most 5,000 µm.

Clause 29: The protected substrate of any of clauses 17-8, wherein the first temporary protective sheet and/or the second temporary protective sheet is configured to be removed from the protected substrate, wherein removal of the first temporary protective sheet and/or the second temporary protective sheet from the protected substrate does not peel a majority of the temporary protective layer from the surface.

Clause 30: The protected substrate of any of clauses 17-9, wherein the temporary protective layer comprises a material having a melting point of at least 60° C.

Clause 31: The protected substrate of any of clauses 17-30, wherein the temporary protective layer comprises a hydrophobic material.

Clause 32: The protected substrate of any of clauses 17-31, wherein when the temporary protective layer contacts water, the temporary protective layer exhibits a water contact angle of at least 60°.

Clause 33: The protected substrate of any of clauses 17-32, wherein the temporary protective layer is water impermeable.

Clause 34: The protected substrate of any of clauses 17-33, wherein the temporary protective layer provides increased corrosion protection to the substrate, compared to the same substrate not including the temporary protective layer.

Clause 35: A protected substrate, comprising: a planar substrate comprising a surface; a first portion of the surface over which a temporary protective layer is applied; a second portion of the surface over which a first temporary protective sheet is positioned; and a third portion of the surface over which a second temporary protective sheet is positioned, wherein the first portion is not covered by the first or second temporary protective sheets, wherein the temporary protective layer is positioned directly beneath the first and/or second protective sheet and is positioned between the substrate and the first and/or second temporary protective sheet, wherein the first temporary protective sheet does or does not overlap the second temporary protective sheet.

Clause 36: The protected substrate of clause 35 further comprising a tape positioned over at least the first portion of the surface, a portion of the first temporary protective sheet and a portion of the second temporary protective sheet.

Clause 37: The protected substrate of clause 36, wherein a portion of the tape is positioned over at least a portion of the temporary protective layer.

Clause 38: The protected substrate of clause 37, wherein a gap is defined between the portion of the tape positioned over the portion of the temporary protective layer, and the portion of the temporary protective layer.

Clause 39: The protected substrate of any of clauses 35-38, wherein the temporary protective layer is removable by burning, vaporizing, removing using a solvent, or peeling.

Clause 40: The protected substrate of any of clauses 35-39, wherein the planar substrate comprises glass.

Clause 41: The protected substrate of any of clauses 35-40, wherein the planar substrate comprises metal or wood.

Clause 42: The protected substrate of any of clauses 35-41, further comprising a functional coating positioned over the surface and between the surface and the temporary protective layer.

Clause 43: The protected substrate of clause 42, wherein the functional coating comprises a low-E coating.

Clause 44: The protected substrate of any of clauses 35-43, wherein the temporary protective layer comprises a material comprising a wax, a polyolefin, a poly(meth)acrylate, a polyester, an alkene, or some combination thereof.

Clause 45: The protected substrate of clause 44, wherein the wax comprises a polyethylene wax.

Clause 46: The protected substrate of any of clauses 35-45, wherein the temporary protective layer comprises a thickness of at least 10 nm and at most 5,000 µm.

Clause 47: The protected substrate of any of clauses 35-46, wherein the first temporary protective sheet and/or the second temporary protective sheet is configured to be removed from the protected substrate, wherein removal of the first temporary protective sheet and/or the second temporary protective sheet from the protected substrate does not peel a majority of the temporary protective layer from the surface.

Clause 48: The protected substrate of any of clauses 35-47, wherein the temporary protective layer comprises a material having a melting point of at least 60° C.

Clause 49: The protected substrate of any of clauses 35-48, wherein the temporary protective layer comprises a hydrophobic material.

Clause 50: The protected substrate of any of clauses 35-49, wherein when the temporary protective layer contacts water, the temporary protective layer exhibits a water contact angle of at least 60°.

Clause 51: The protected substrate of any of clauses 35-50, wherein the temporary protective layer is water impermeable.

Clause 52: The protected substrate of any of clauses 35-51, wherein the temporary protective layer provides increased corrosion protection to the substrate, compared to the same substrate not including the temporary protective layer.

Clause 53: A method for protecting a substrate, comprising: providing a planar substrate comprising a surface; applying a material to form a temporary protective layer over at least a first portion of the surface; adhering a first temporary protective sheet over a second portion of the surface, wherein a portion of the first temporary protective sheet overlaps a first portion of the temporary protective layer; and adhering a second temporary protective sheet over a second portion of the temporary protective layer and over a third portion of the surface, wherein an overlap is formed between the first temporary protective sheet and the second temporary protective sheet, and wherein a gap is defined by the overlap between the second temporary protective sheet and the surface.

Clause 54: The method of clause 53, wherein the material is applied over the at least a first portion of the surface by spray coating, curtain coating, powder coating, brush coating, roll coating, inkjet printing, or some combination thereof.

Clause 55: The method of clause 53 or 54, wherein the material is an emulsion comprising a hydrophobic material, water, and a surfactant.

Clause 56: The method of clause 55, wherein the surfactant is non-ionic.

Clause 57: The method of any of clauses 53-56, further comprising heating the material to a temperature to form a molten liquid prior to application of the material.

Clause 58: The method of clause 57, wherein the material is a thermoplastic or a thermoset.

Clause 59: The method of clause 57 or 58, wherein the material is applied to the first portion of the surface at a temperature above a melting point of the material.

Clause 60: The method of any of clauses 57-59, wherein the molten liquid is applied to the first portion of the surface by bubbling a gas through the molten liquid.

Clause 61: The method of clause 60, wherein the gas comprises an inert gas.

Clause 62: The method of any of clauses 53-61, wherein the material comprises a hydrophobic material dissolved in a solvent.

Clause 63: The method of any of clauses 53-62, wherein the material comprises a UV curable or heat curable material, wherein the applied material is exposed to a UV source or heat to crosslink the applied material.

Clause 64: The method of any of clauses 53-63, wherein the material comprises a two component resin, wherein the components of the resin react to crosslink the resin upon application of the material.

Clause 65: The method of any of clauses 53-64, further comprising removing the temporary protective layer by burning, vaporizing, removing using a solvent, or peeling.

Clause 66: The method of any of clauses 53-65, wherein the planar substrate comprises glass.

Clause 67: The method of any of clauses 53-66, wherein the planar substrate comprises metal or wood.

Clause 68: The method of any of clauses 53-67, wherein the planar substrate comprises a functional coating positioned over the surface and between the surface and the temporary protective layer.

Clause 69: The method of clause 68, wherein the functional coating comprises a low-E coating.

Clause 70: The method of any of clauses 53-69, wherein the temporary protective layer comprises a material comprising a wax, a polyolefin, a poly(meth)acrylate, a polyester, an alkene, or some combination thereof.

Clause 71: The method of clause 70, wherein the wax comprises a polyethylene wax.

Clause 72: The method of any of clauses 53-71, wherein the material is applied such that the formed temporary protective layer comprises a thickness of at least 10 nm and at most 5,000 µm.

Clause 73: The method of any of clauses 53-72, wherein the first temporary protective sheet and/or the second temporary protective sheet is configured to be removed from the protected substrate, wherein removal of the first temporary protective sheet and/or the second temporary protective sheet from the protected substrate does not peel a majority of the temporary protective layer from the surface.

Clause 74: The method of any of clauses 53-73, wherein the material comprises a melting point of at least 60° C.

Clause 75: The method of any of clauses 53-74, wherein the material comprises a hydrophobic material.

Clause 76: The method of any of clauses 53-75, wherein the temporary protective layer is water impermeable.

Clause 77: The method of any of clauses 53-76, wherein the temporary protective layer provides increased corrosion protection to the substrate, compared to the same substrate not including the temporary protective layer.

Clause 78: The method of any of clauses 53-77, further comprising applying a tape over a portion of the first temporary protective sheet and the second temporary protective sheet.

Clause 79: A method for protecting a substrate, comprising: providing a planar substrate comprising a surface; applying a material to form a temporary protective layer over at least a first portion of the surface; adhering a first temporary protective sheet over a second portion of the surface; and adhering a second temporary protective sheet over a third portion of the surface wherein a space is formed between the first temporary protective sheet and the second temporary protective sheet, wherein the space is over the first portion of the surface, and wherein the temporary protective layer is positioned directly beneath the first and/or second protective sheet and is positioned between the substrate and the first and/or second temporary protective sheet.

Clause 80: The method of clause 79, further comprising applying tape to over the first portion of the surface, over a portion of the first temporary protective sheet, and over a portion of the second temporary protective sheet.

Clause 81: The method of clause 80, wherein the tape is positioned over the temporary protective layer.

Clause 82: The method of clause 81, wherein a gap is defined between a portion of the tape and a portion of the temporary protective layer.

Clause 83: The method of any of clauses 79-82, wherein the material is applied over the at least a first portion of the surface by spray coating, curtain coating, powder coating, brush coating, roll coating, inkjet printing, or some combination thereof.

Clause 84: The method of any of clauses 79-83, wherein the material is an emulsion comprising a hydrophobic material, water, and a surfactant.

Clause 85: The method of clause 84, wherein the surfactant is non-ionic.

Clause 86: The method of any of clauses 79-85, further comprising heating the material to a temperature to form a molten liquid prior to application of the material.

Clause 87: The method of clause 86, wherein the material is a thermoplastic or a thermoset.

Clause 88: The method of clause 86 or 87, wherein the material is applied to the first portion of the surface at a temperature above a melting point of the material.

Clause 89: The method of any of clauses 86-88, wherein the molten liquid is applied to the first portion of the surface by bubbling a gas through the molten liquid.

Clause 90: The method of clause 89, wherein the gas comprises an inert gas.

Clause 91: The method of any of clauses 79-90, wherein the material comprises a hydrophobic material dissolved in a solvent.

Clause 92: The method of any of clauses 79-91, wherein the material comprises a UV curable or heat curable material, wherein the applied material is exposed to a UV source or heat to crosslink the applied material.

Clause 93: The method of any of clauses 79-92, wherein the material comprises a two component resin, wherein the components of the resin react to crossslink the resin upon application of the material.

Clause 94: The method of any of clauses 79-93, further comprising removing the temporary protective layer by burning, vaporizing, removing using a solvent, or peeling.

Clause 95: The method of any of clauses 79-94, wherein the planar substrate comprises glass.

Clause 96: The method of any of clauses 79-95, wherein the planar substrate comprises metal or wood.

Clause 97: The method of any of clauses 79-96, wherein the planar substrate comprises a functional coating positioned over the surface and between the surface and the temporary protective layer.

Clause 98: The method of clause 97, wherein the functional coating comprises a low-E coating.

Clause 99: The method of any of clauses 79-98, wherein the temporary protective layer comprises a material comprising a wax, a polyolefin, a poly(meth)acrylate, a polyester, an alkene, or some combination thereof.

Clause 100: The method of clause 99, wherein the wax comprises a polyethylene wax.

Clause 101: The method of any of clauses 79-100, wherein the material is applied such that the formed temporary protective layer comprises a thickness of at least 10 nm and at most 5,000 µm.

Clause 102: The method of any of clauses 79-101, wherein the first temporary protective sheet and/or the second temporary protective sheet is configured to be removed from the protected substrate, wherein removal of the first temporary protective sheet and/or the second temporary protective sheet from the protected substrate does not peel a majority of the temporary protective layer from the surface.

Clause 103: The method of any of clauses 79-02, wherein the material comprises a melting point of at least 60° C.

Clause 104: The method of any of clauses 79-03, wherein the material comprises a hydrophobic material.

Clause 105: The method of any of clauses 79-04, wherein the temporary protective layer is water impermeable.

Clause 106: The method of any of clauses 79-05, wherein the temporary protective layer provides increased corrosion protection to the substrate, compared to the same substrate not including the temporary protective layer.

Clause 107: A protected substrate, comprising: a planar substrate comprising a surface; and a temporary protective layer positioned over at least a portion of the surface, wherein the temporary protective layer comprises a wax, a polyolefin, a poly(meth)acrylate, a polyester, an alkene, polyethylene, polypropylene, polyacrylate, polymethyl methacrylate, polylactic acid, polyethylene carbonate (PEC), polypropylene carbonate (PPC), polycaprolactone, polyoxymethylene, or some combination thereof.

Clause 108: The protected substrate of clause 107, wherein the temporary protective layer comprises a thickness of at least 10 nm and at most 5,000 µm.

Clause 109: The protected substrate of clause 107 or 108, wherein the planar substrate comprises glass.

Clause 110: The protected substrate of any of clauses 107-09, wherein the planar substrate comprises metal or wood.

Clause 111: The protected substrate of any of clauses 107-10, wherein the temporary protective layer comprises an alkane, ester, or carboxylic acid having at least 40 wt. % carbon.

Clause 112: The protected substrate of any of clauses 107-11, wherein the protected substrate does not include a temporary protective sheet positioned over the surface.

Clause 113: The protected substrate of any of clauses 107-12, wherein the temporary protective layer is an outermost layer of the planar substrate.

Clause 114: The protected substrate of any of clauses 107-13, wherein the temporary protective layer is positioned over at least the entire surface.

Clause 115: A protected substrate, comprising: a planar substrate comprising a surface; and a burn-off temporary protective layer positioned over at least a portion of the surface, wherein the burn-off temporary protective layer comprises a wax, a polyolefin, a polyester, a polycarbonate, a polyether, or some combination thereof, wherein the burn-off temporary protective layer is removable by a heat treatment process that does not substantially damage the surface.

Clause 116: The protected substrate of clause 115, wherein the burn-off temporary protective layer comprises polylactic acid (PLA), polyethylene carbonate (PEC), polypropylene carbonate (PPC), polycaprolactone, polyoxymethylene, polyethylene, polypropylene, or some combination thereof.

Clause 117: The protected substrate of clause 115 or 116, wherein the burn-off temporary protective layer comprises a thickness of at least 10 nm and at most 5,000 µm.

Clause 118: The protected substrate of any of clauses 115-17, wherein the planar substrate comprises glass.

Clause 119: The protected substrate of any of clauses 115-18, wherein the protected substrate does not include a temporary protective sheet positioned over the surface.

Clause 120: The protected substrate of any of clauses 115-19, wherein the burn-off temporary protective layer is an outermost layer of the planar substrate.

Clause 121: The protected substrate of any of clauses 115-20, wherein the burn-off temporary protective layer is positioned over the entire surface and at least a portion of an edge of the substrate.

Clause 122: The protected substrate of any of clauses 115-21, wherein the burn-off temporary protective layer is removable by burning at a temperature of at most 1000° C.

Clause 123: The protected substrate of any of clauses 115-22, wherein the heat treatment process burning comprises burning the burn-off temporary protective layer without substantial damage of the surface.

Clause 124: The protected substrate of any of clauses 115-23, wherein the heat treatment process does not cause the surface to have a color change (DECMC) of more than 3 units compared to a color of the surface before the heat treatment process.

Clause 125: The protected substrate of any of clauses 115-24, further comprising a functional coating positioned between the surface and the burn-off temporary protective layer.

Clause 126: The protected substrate of clause 125, wherein the functional coating comprises a low-E coating layer.

Clause 127: The protected substrate of any of clauses 115-26, wherein the burn-off temporary protective layer comprises a material having a melting point of at least 60° C. and at most 350° C.

Clause 128: The protected substrate of any of clauses 115-27, wherein the burn-off temporary protective layer comprises polylactic acid (PLA) and methyl acetate.

Clause 129: A method for protecting a substrate, comprising: providing a planar substrate comprising a surface; and applying a material to form a burn-off temporary protective layer over at least a first portion of the surface, wherein the burn-off temporary protective layer comprises a wax, a polyolefin, a polyester, a polycarbonate, a polyether, or some combination thereof, wherein the burn-off temporary protective layer is removable by a heat treatment process that does not substantially damage the surface.

Clause 130: The method of clause 129, wherein the burn-off temporary protective layer comprises polylactic acid (PLA), polyethylene carbonate (PEC), polypropylene carbonate (PPC), polycaprolactone, polyoxymethylene, polyethylene, polypropylene, or some combination thereof.

Clause 131: The method of clause 129 or 130, wherein the planar substrate comprises glass.

Clause 132: The method of clause 130 or 131, further comprising: preparing the material by dissolving the polylactic acid (PLA) in methyl acetate, wherein the material is applied to form the burn-off temporary protective layer by curtain coating.

Clause 133: A method of removing a burn-off temporary protective layer from a coated substrate, comprising: providing a coated substrate comprising a surface over a portion of which a burn-off temporary protective layer is applied, wherein the burn-off temporary protective layer comprises a wax, a polyolefin, a polyester, a polycarbonate, a polyether, or some combination thereof; and removing the burn-off temporary protective layer from the surface by burning the burn-off temporary protective layer to form an unprotected substrate without substantially damaging the surface.

Clause 134: The method of clause 133, wherein the burn-off temporary protective layer comprises polylactic acid (PLA), polyethylene carbonate (PEC), polypropylene carbonate (PPC), polycaprolactone, polyoxymethylene, polyethylene, polypropylene, or some combination thereof.

Clause 135: The method of clause 133 or 134, wherein the coated substrate comprises coated glass.

Clause 136: The method of any of clauses 133-35, wherein the coated substrate is heated to a temperature of up to 1000° C. to remove the burn-off temporary protective layer from the surface.

Clause 137: A protected substrate, comprising: a planar substrate comprising a surface; a temporary protective layer positioned over at least a portion of the surface; a first temporary protective sheet positioned over at least a first portion of the surface; and a second temporary protective sheet positioned over at least a second portion the surface, wherein an overlapping portion of the second temporary protective sheet overlaps an overlapping portion of the first temporary protective sheet at an overlap; wherein a gap is defined by the overlap between the second temporary protective sheet and a portion of the surface, wherein a portion of the temporary protective layer is positioned between the second temporary protective sheet and the portion of the surface.

Clause 138: The protected substrate of clause 137, wherein the temporary protective layer is removable by burning, vaporizing, removing using a solvent, or peeling.

Clause 139: The protected substrate of clause 137 or 138, wherein the planar substrate comprises glass.

Clause 140: The protected substrate of any of clauses 137-39, further comprising a functional coating positioned over the surface and between the surface and the temporary protective layer.

Clause 141: The protected substrate of clause 140, wherein the functional coating comprises a low-E coating layer.

Clause 142: The protected substrate of any of clauses 137-41, wherein the temporary protective layer comprises a material comprising a wax, an organic oil, a polyolefin, a poly(meth)acrylate, a polyester, an alkene, polyethylene, polypropylene, or some combination thereof.

Clause 143: The protected substrate of clause 142, wherein the temporary protective layer comprises polylactic acid (PLA), polyethylene carbonate (PEC), polypropylene carbonate (PPC), polycaprolactone, polyoxymethylene, polyethylene, polypropylene, or some combination thereof.

Clause 144: The protected substrate of any of clauses 137-43, wherein the first temporary protective sheet and/or the second temporary protective sheet is configured to be removed from the protected substrate, wherein removal of the first temporary protective sheet and/or the second temporary protective sheet from the protected substrate does not peel a majority of the temporary protective layer from the surface.

Clause 145: The protected substrate of any of clauses 137-44, wherein the temporary protective layer comprises a material having a melting point of at least 60° C. and at most 350° C.

Clause 146: The protected substrate of any of clauses 137-45, wherein when the temporary protective layer contacts water, the temporary protective layer exhibits a water contact angle of at least 60°.

Clause 147: A protected substrate, comprising: a planar substrate comprising a surface; a first temporary protective sheet positioned over a first portion of the surface; a second temporary protective sheet positioned over a second portion of the surface, wherein a third portion of the surface is not covered by the first temporary protective sheet and wherein the third portion of the surface is not covered by the second temporary protective sheet; and a temporary protective layer over at least the third portion of the surface, wherein the temporary protective layer is positioned directly beneath the first and/or second protective sheet and is positioned between the substrate and the first and/or second temporary protective sheet.

Clause 148: The protected substrate of clause 147, further comprising a tape positioned over at least the third portion of the surface, a portion of the first temporary protective sheet and a portion of the second temporary protective sheet.

Clause 149: The protected substrate of clause 147 or 148, wherein the temporary protective layer is removable by burning, vaporizing, removing using a solvent, or peeling.

Clause 150: The protected substrate of any of clauses 147-49, wherein the planar substrate comprises glass.

Clause 151: The protected substrate of any of clauses 147-50, further comprising a coating positioned between the surface and the temporary protective layer.

Clause 152: The protected substrate of clause 151, wherein the coating comprises a low-E coating.

Clause 153: The protected substrate of any of clauses 147-52, wherein the temporary protective layer comprises a material comprising a wax, an organic oil, a polyolefin, a poly(meth)acrylate, a polyester, an alkene, or some combination thereof.

Clause 154: The protected substrate of any of clauses 147-53, wherein the temporary protective layer comprises a material having a melting point of at least 60° C. and at most 350° C.

Clause 155: A method for protecting a substrate, comprising: providing a planar substrate comprising a surface; applying a material to form a temporary protective layer over at least a first portion of the surface; adhering a first temporary protective sheet over a second portion of the surface, wherein a portion of the first temporary protective sheet overlaps a first portion of the temporary protective layer; and adhering a second temporary protective sheet over a second portion of the temporary protective layer and over a third portion of the surface, wherein an overlap is formed between the first temporary protective sheet and the second temporary protective sheet, and wherein a gap is defined by the overlap between the second temporary protective sheet and the surface.

Clause 156: A method of removing a temporary protective layer from a coated substrate comprising: providing a protected substrate, comprising: a planar substrate comprising a surface; a temporary protective layer positioned over at least a portion of the surface; a first temporary protective sheet positioned over at least a first portion of the surface; and a second temporary protective sheet positioned over at least a second portion the surface, wherein an overlapping portion of the second temporary protective sheet overlaps an overlapping portion of the first temporary protective sheet at an overlap; wherein a gap is defined by the overlap between the second temporary protective sheet and a portion of the surface, wherein a portion of the temporary protective layer is positioned between the second temporary protective sheet and the portion of the surface; removing the first temporary protective sheet and/or the temporary protective sheet by peeling; and removing the temporary protective layer from the surface by burning, vaporizing, removing using a solvent, or peeling the temporary protective layer to form an unprotected substrate.

Clause 157: The method of clause 156, wherein the protected substrate is heated to a temperature of up to 1000° C. to remove the temporary protective layer from the surface.

Clause 158: A protected substrate, comprising: a planar substrate comprising a surface; and a burn-off temporary protective layer positioned over at least a portion of the surface, wherein the burn-off temporary protective layer comprises a wax, a polyolefin, a polyester, a polycarbonate, a polyether, or some combination thereof, wherein the burn-off temporary protective layer is removable by a heat treatment process that does not substantially damage the surface.

Clause 159: The protected substrate of clause 158, wherein the burn-off temporary protective layer comprises a protective film.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A protected substrate, comprising:
a planar substrate comprising a surface; and
a burn-off temporary protective layer positioned over at least a portion of the surface,
wherein the burn-off temporary protective layer comprises polylactic acid (PLA),
wherein the burn-off temporary protective layer is removable by a heat treatment process that does not substantially damage the surface.

2. The protected substrate of claim 1, wherein the burn-off temporary protective layer further comprises polyethylene carbonate (PEC), polypropylene carbonate (PPC), polycaprolactone, polyoxymethylene, polyethylene, polypropylene, or some combination thereof.

3. The protected substrate of claim 1, wherein the burn-off temporary protective layer comprises a thickness of at least 10 nm and at most 5,000 µm.

4. The protected substrate of claim 1, wherein the planar substrate comprises glass.

5. The protected substrate of claim 1, wherein the protected substrate does not include a temporary protective sheet positioned over the surface.

6. The protected substrate of claim 1, wherein the burn-off temporary protective layer is an outermost layer of the planar substrate.

7. The protected substrate of claim 1, wherein the burn-off temporary protective layer is positioned over the entire surface and at least a portion of an edge of the substrate.

8. The protected substrate of claim 1, wherein the burn-off temporary protective layer is removable by burning at a temperature of at most 1000° C.

9. The protected substrate of claim 1, wherein the heat treatment process does not cause the surface to have a color change (DECMC) of more than 3 units compared to a color of the surface before the heat treatment process.

10. The protected substrate of claim 1, further comprising a functional coating positioned between the surface and the burn-off temporary protective layer.

11. The protected substrate of claim 10, wherein the functional coating comprises a low-E coating layer.

12. The protected substrate of claim 1, wherein the burn-off temporary protective layer comprises a material having a melting point of at least 60° C. and at most 350° C.

13. The protected substrate of claim 1, wherein the burn-off temporary protective layer further comprises methyl acetate.

14. The protected substrate of claim 1, wherein the burn-off temporary protective layer comprises a solvent.

15. A method for protecting a substrate, comprising:
providing a planar substrate comprising a surface; and
applying a material to form a burn-off temporary protective layer over at least a first portion of the surface,
wherein the burn-off temporary protective layer comprises polylactic acid (PLA),
wherein the burn-off temporary protective layer is removable by a heat treatment process that does not substantially damage the surface.

16. The method of claim 15, wherein the burn-off temporary protective layer further comprises polyethylene carbonate (PEC), polypropylene carbonate (PPC), polycaprolactone, polyoxymethylene, polyethylene, polypropylene, or some combination thereof.

17. The method of claim 15, wherein the planar substrate comprises glass.

18. The method of claim 15, further comprising:
preparing the material by dissolving the polylactic acid (PLA) in methyl acetate, wherein the material is applied to form the burn-off temporary protective layer by curtain coating.

19. A method of removing a burn-off temporary protective layer from a coated substrate, comprising:
providing a coated planar substrate comprising a surface over a portion of which a burn-off temporary protective layer is applied, wherein the burn-off temporary protective layer comprises polylactic acid (PLA); and
removing the burn-off temporary protective layer from the surface by burning the burn-off temporary protective layer to form an unprotected substrate without substantially damaging the surface.

20. The method of claim 19, wherein the burn-off temporary protective layer further comprises polyethylene carbonate (PEC), polypropylene carbonate (PPC), polycaprolactone, polyoxymethylene, polyethylene, polypropylene, or some combination thereof.

* * * * *